Jan. 4, 1949.   F. TUTTLE   2,458,448
GUN TRAINING BY TRACER FIRE SPOTTING
Filed Feb. 26, 1944   7 Sheets-Sheet 1

FORDYCE TUTTLE
INVENTOR
ATTY & AG'T

Jan. 4, 1949.  F. TUTTLE  2,458,448
GUN TRAINING BY TRACER FIRE SPOTTING
Filed Feb. 26, 1944  7 Sheets-Sheet 2

FORDYCE TUTTLE
INVENTOR
ATTY & AGT

Jan. 4, 1949.   F. TUTTLE   2,458,448
GUN TRAINING BY TRACER FIRE SPOTTING
Filed Feb. 26, 1944   7 Sheets-Sheet 3

FORDYCE TUTTLE
INVENTOR

BY
ATT'Y & AG'T

Jan. 4, 1949. F. TUTTLE 2,458,448
GUN TRAINING BY TRACER FIRE SPOTTING
Filed Feb. 26, 1944 7 Sheets-Sheet 4

FORDYCE TUTTLE
INVENTOR
BY
ATTY & AGT

Jan. 4, 1949.  F. TUTTLE  2,458,448
GUN TRAINING BY TRACER FIRE SPOTTING
Filed Feb. 26, 1944  7 Sheets-Sheet 5

FORDYCE TUTTLE
*INVENTOR*

BY
ATT'Y & AG'T

Jan. 4, 1949. F. TUTTLE 2,458,448
GUN TRAINING BY TRACER FIRE SPOTTING
Filed Feb. 26, 1944 7 Sheets-Sheet 6

FORDYCE TUTTLE
INVENTOR
BY
ATT'Y & AG'T

Jan. 4, 1949.  F. TUTTLE  2,458,448
GUN TRAINING BY TRACER FIRE SPOTTING
Filed Feb. 26, 1944  7 Sheets-Sheet 7

FORDYCE TUTTLE
INVENTOR

UNITED STATES PATENT OFFICE 2,458,448

GUN TRAINING BY TRACER FIRE SPOTTING

Fordyce Tuttle, Rochester, N. Y., assignor to Eastman Kodak Company, Rochester, N. Y., a corporation of New Jersey Application February 26, 1944, Serial No. 524,028

9 Claims. (Cl. 89—41)

This invention relates to fire control particularly to methods and apparatus for spotting the tracer fire from rapid fire guns and for controlling the aim accordingly.

It has been found in practice that the operator of a gun using tracer fire along with the damage-inflicting fire can usually direct the fire accurately as far as alignment is concerned, but is unable to distinguish between fire which is accurately on target and that which is going above or below the target. A certain degree of success has been obtained in overcoming this difficulty by the use of accentuated stereoscopy. That is, the gunner or at least the one sighting the gun, is provided with a stereo viewing instrument having widely separated viewing points. However, even this system has its drawbacks and under the conditions in which it is used it has been found that the accentuated stereoscopic vision is not reliable and the tracer fire appears to move back and forth in depth.

The object of the present invention is to improve the accuracy of fire and to eliminate the above mentioned disadvantages of prior systems.

Those familiar with coincidence range finders will recognize the similarity between such finders and the optical system of the present invention. However, the instruments are used in an entirely different manner and the form which is best for the present invention is that which is least favored in range finder design. Accurate range finders of the coincidence type usually have a split field either inverted or erect or have a small spot superimposed on a large field. On the other hand the present invention, at least in its most practical form, employs a full field superimposed coincidence system and could not be operated at all using a split field system. The methods of the present invention can be practiced with part field superimposed coincidence instruments, but this is not nearly as satisfactory as a full field instrument.

According to the present invention there is provided a method of fire control which involves sending tracer fire along with damage inflicting fire from a rapid fire gun. Using an instrument similar to a range finder, images of the target being fired on are viewed in superimposed relation in a single plane and since the images are from spaced viewing points, the tracer fire appears along with the superimposed images as two lines crossing over at a distant point. The instrument is then adjusted to bring the target images into coincidence. It can now be seen by optical analysis that the point at which the crossover of the two tracer fire lines appears must be at the same distance from the instrument as the plane for which the instrument is adjusted for coincidence. Therefore, since the instrument is now adjusted to bring the target images into coincidence, the crossover of the tracer fire must correspond to that point of the actual tracer fire which is in the plane of the target. Thus, the next step of this invention is to aim the gun to bring the apparent crossover point of the tracer fire onto the target. With such an arrangement the gun is not only properly aligned as to azimuth but also as to elevation or range.

In the preferred form of the invention, color filters are included in the paths of the two beams of light forming the superimposed images so that these images are differently colored and the two lines of the tracer fire image are also differently colored. With such an arrangement the crossover point appears to be the additive combination of the two separate colors. For example if complementary color filters such as complementary red and green are used, the tracer fire lines appear red and green but the crossover point appears white. It is relatively easy in practice to visualize when this white crossover point is "on target."

There are many species and forms of the present invention depending on the type of gun to which it is applied and on the accuracy required. The simplest form of the invention is one in which the tracer observer actually moves the gun either manually or by some suitable mechanism in order to bring the tracer crossover on target. This is the form of the invention most useful in fighter planes in which the pilot is his own observer and in which the guns are rigidly attached to the plane, aiming being provided by the direction of the plane itself. In this embodiment of the invention it is preferable to have the coincidence adjustment control knob located conveniently with respect to the instruments in the same way as the gun firing button is mounted on one of the control levers. It is also desirable to have the optical system mounted above or below the direct line of sight of the pilot so that even when he is observing the tracer fire with one eye, the vision of the other eye is not obscured.

In any of the forms of the invention it is usually desirable to make an approximate setting of the gun before one starts firing which means that the tracer fire is not available for the practice of the present invention. This approximate aiming of the gun may be accomplished by providing a reticle indicative of the actual gun aim and visible in the field of the target images which are being brought into coincidence. The observer then aims the gun approximately by this reticle, making allowances for the lead required and the other ballistic factors. The tracer fire is then started and the aim corrected by the present invention. It is sometimes desirable, particularly in airplane gun sights, to have as large a field of view as possible. If the simplest form of instrument is used, with a reticle fixed in the center of the field and the instrument therefore fixed relative to the direction of the gun, the permissible lead angle is only half the field of the instrument since otherwise the target itself would be out of the field. The permissible lead angle may be approximately doubled by having the instrument as a whole movable through a slight angle while the reticle itself remains fixed. For example, in an airplane gun sight the reticle is rigidly attached to the plane, but the optical instrument for viewing the target and reticle is movable through a slight angle so that the center of the reticle may be anywhere within the field of view. With the reticle at one edge of the field of view and the target at the other edge, the lead provided is equal to the full angular field of view.

The second species of the invention is one in which the observer employing the sighting device adjusts the gun sights through which the gunner aims. This may be the only adjustment of the gun sights, or may be a secondary adjustment, the primary adjustment being provided by other means. For example, the adjustment of the instrument to bring the target images into coincidence is a measure of range and this adjustment may be coupled directly to the sights to allow for the target distance. Other ballistic factors may be set into the sight adjustment by independent observers. In any case it is desirable to allow the tracer observer to make only minor adjustment of the sights so that the gunner and the tracer observer will not be working at odds.

The third and most preferred form of the invention when highest accuracy is desired employs a director to provide the primary setting of the aim and employs the present invention mainly for modifying the effect of the director. The director aims the gun providing for such ballistic factors as range, lead (target movement), gravity, wind, etc., and if the gun is mounted on a ship, the movement of the gun support. The modification of this direction control by the present invention may be provided in a number of ways. For example, the coupling between the director and the azimuth and elevation controls of the gun may be independently modified to make a slight correction in either azimuth or elevation or both. However since the present invention is mainly required for the correction of the lead on the target, the modification may be applied to any stage of the computation which affects the range of the target. For example, any lever system transmitting the range factor may have a fulcrum adjusted by the tracer spotter so that the director responds to a range setting which makes the tracer crossover fall on target, independent of the absolute value of the target range.

The combination of devices necessary for the operation of the present invention is apparent from the above discussion thereof and will be particularly understood from the following description when read along with the accompanying drawings in which.

Figures 1, 2, 3, 4:
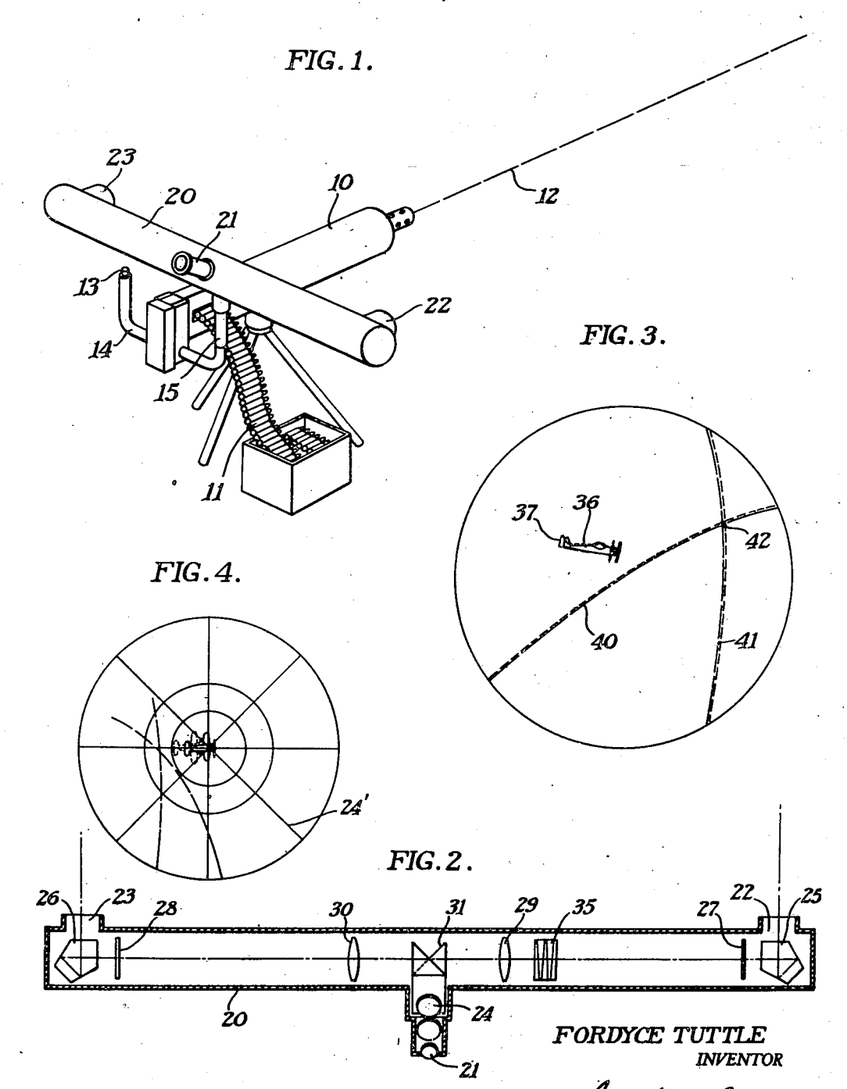
Fig. 1 is a perspective view of a machine gun incorporating a simple form of the invention.
Fig. 2 is a plan view partly in section of the optical system employed in Fig. 1.
Fig. 3 is a view through the eyepiece of the instrument.
Fig. 4 is the view through an alternative form of eyepiece, in which a reticle is included in the comparison plane.

In Fig. 1 a machine gun 10 fed by a belt of shells 11 including tracer fire bullets periodically, sends out fire with a tracer represented by the broken line 12. The fire is started or stopped by operation of a push button 13 on the end of a U-shaped control arm 14, the other end of which carries a rotatable handle 15 connected to a tracer spotting instrument shown best in Fig. 2. This instrument is supported separately from the rotating handle 15 by suitable arms (not shown) connected to the gun tripod.

The tracer fire spotting instrument consists of a housing 20 having windows 22 and 23 at spaced viewing points through which light is received from the target and from the tracer fire and directed by penta prisms 25 and 26 through color filters 27 and 28 toward objectives 29 and 30. The target images formed by these objectives are brought into superimposed relation by a suitable prism assembly 31 which forms superimposed full-field images in an image plane 24 which may be viewed through an eyepiece 21 at an angle to the so-called ranging plane which plane includes the optical axis of the instrument and the target. Coincidence of these target images is provided by a light deviator 35 which is adjusted by the rotatable handle 15 shown in Fig. 1.

For example as shown in Fig. 3 the images 36 and 37 of a target are seen more or less centrally located in the field of view and can be brought into coincidence by adjusting the light deviator 35. The tracer fire line 12 appears as two images 40 and 41 which, due to the filters 27 and 28 are differently colored and which cross over at a point 42 whose color is the additive combination of colors of the individual images. If the individual images have complementary colors the crossover point appears white. The two images 40 and 41 are due to the separation of the viewing points 22 and 23 and they appear to cross over because of the geometry of the instrument. The crossover point 42 is at that point of the actual tracer fire which is at the same distance from the instrument as is the plane for which the instrument is adjusted to coincidence. This is all due to the geometry of the optics involved. Therefore when the instrument is adjusted by means of the light deviator 35 to bring the target images 36 and 37 exactly into coincidence the crossover point 42 represents that part of the tracer fire which is at the same distance as the target. Thus, when the point 42 is brought on target by suitable movement of the gun, the gun is properly aimed independent of the position of the viewing points 22 and 23 relative to the gun itself.

By way of example, it is pointed out that if one of the viewing points is directly in line with the gun and the gun is aimed properly in azimuth on a stationary target or one whose azimuth is not changing, one of the tracer fire images will always appear to go through the target. Correct elevation of the gun will then be secured as before when the other image appears also to go through the target, i. e. when the crossover point is on target. On the other hand if both viewing points are off to one side of the gun, adjustment of the gun to proper azimuth will still not bring either tracer fire image in line with the target, but as before all such factors cancel out when the crossover point of the tracer image is on target, the target images having first been brought into coincidence of course.

In a slightly different embodiment of the invention a reticle consisting of radial lines and concentric circles is included in the image plane 24. The image of this reticle 24' appears as shown in Fig. 4 and has been found to be an aid to the gunner in preliminary aiming of the gun before the tracer fire is started.

Figure 5:
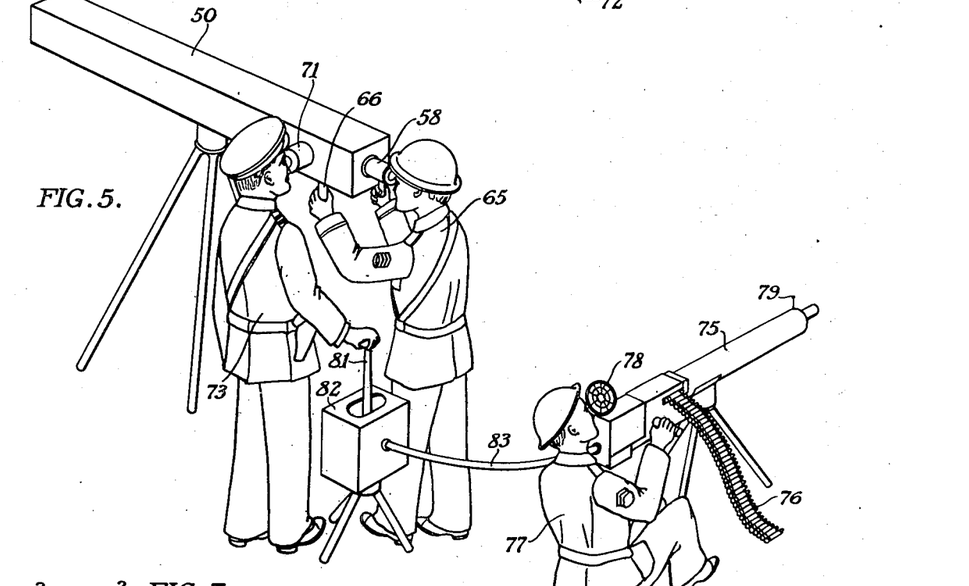
Fig. 5 is a perspective schematic view of a machine gun and a gun sight control according to the invention.
Figure 6:
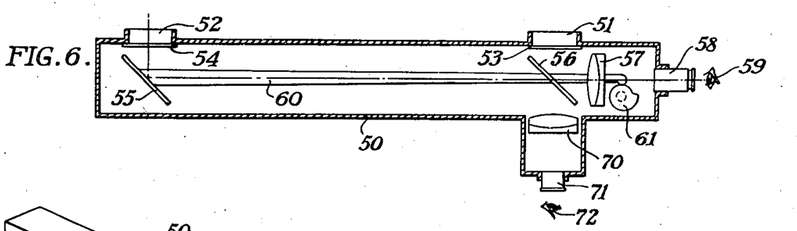
Fig. 6 is a plan view partly in section of the optical system employed in Fig. 5.

The arrangement shown in Figs. 5 and 6 purposely illustrates separately the fundamental components of a second form of the invention which has certain advantages in practice. In this arrangement the instrument for providing the full-field superimposed target images consists of a housing 50 having front windows 51 and 52 through which light beams are received to be filtered by suitable color filters 53 and 54 and then directed by a mirror 55 and a semi-transparent mirror 56 through an objective 57 to form superimposed full-field images which may be viewed through an eyepiece 58 by the eye 59 of an observer 65. Erecting prisms may be included between the objective 57 and the eyepiece 58 as in Fig. 14 discussed later. This observer 65 brings the target images into coincidence by rotating a handle 66 on which is mounted a cam 61 which in turn operates a long arm 60 to rotate the mirror 55.

According to the invention the other parts of the two target beams as reflected from the semitransparent mirror 56 are brought to focus by an auxiliary objective 70 to form images viewable through an eyepiece 71 by the eye 72 of an auxiliary observer 73 whose sole duty is to watch the tracer fire and make adjustments indicated thereby. Either the observer 65 or the observer 73 may also operate the halving adjustment of the instrument in case the images do not superimpose properly. Similarly either one can be responsible for aligning the whole instrument to keep the target in the field of view. In one preferred form of the invention the field of the observer 73 is provided with a reticle which is independent of the actual gun direction, but which aids in matching the crossover of the tracer fire and the target and in this embodiment, this observer 73 usually endeavors to keep the instrument pretty well centered on the target.

A machine gun 75 fed with the bullets 76 including tracer bullets is aimed and fired by a gunner 77 who looks through a rear sight 78 and a front sight 79. The rear sight 78 is movable sideways and up and down to provide for lead on a moving target and to give proper elevation to the gun. According to the invention when the operator 73 sees that the tracer fire crossover point is not on target, the target images being held in coincidence by the observer 65, this tracer spotter 73 adjusts a joy stick type of control 81 which through any suitable electrical mechanism represented by a box 82 and connecting wires 83 adjusts the elevation and azimuth of the sight 78. The electrical mechanism may consist of the usual potentiometer and servomotors for making such angular adjustments. Of course, the main aiming of the gun is done by the gunner 77 and movement of the stick 81 provides only minor corrections of the aim. Furthermore this latter adjustment in certain embodiments is limited to the adjustment of elevation of the sight 78, the azimuth or lead correction being made by some automatic mechanism not connected with the present invention. However it has been found preferable to permit the observer 73 to make at least refinements in both the azimuth and elevation settings of the gun sight.

Figure 7:
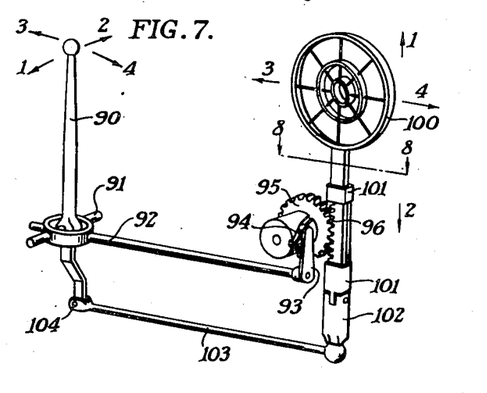
Figs. 7 and 8 show a mechanical form of control for the gun sight alternative to the electrical form illustrated schematically in Fig. 5.
Figure 8:
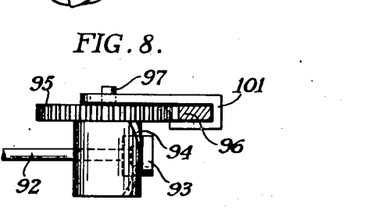

In Figs. 7 and 8 a mechanical alternative for the electrical arrangement of Fig. 5 is shown. A joy stick 90 mounted on pivots and gimbals 91 and 92 is permitted two degrees of freedom of rotation, the components being represented by small arrows 1, 2, 3, and 4 near the top of the stick 90. Rotation back and forth as represented by arrows 1 and 2 rotates the rod 92 and the cam follower 93 against which a cam 94 is held by a suitable spring mechanism not shown. This rotation of the rod 92 thus adjusts the setting of pinion 95, rotation of which moves a rack 96 up and down carrying a rear sight 100 up and down as again indicated by arrows 1 and 2.

Similarly any component of the joy stick 90 motion as represented by arrows 3 and 4 is transmitted through a pivot 104 to a bar 103 to move a sleeve consisting of jointed members 101 and 102 so that the sleeve rotates about a pivot 97 which coincides with the axis of rotation of the cam 94. The two parts 101 and 102 of the sleeve are jointed so that the back and forth motion of the stick 90 has no effect on the position of the sleeve 101.

Figure 9:
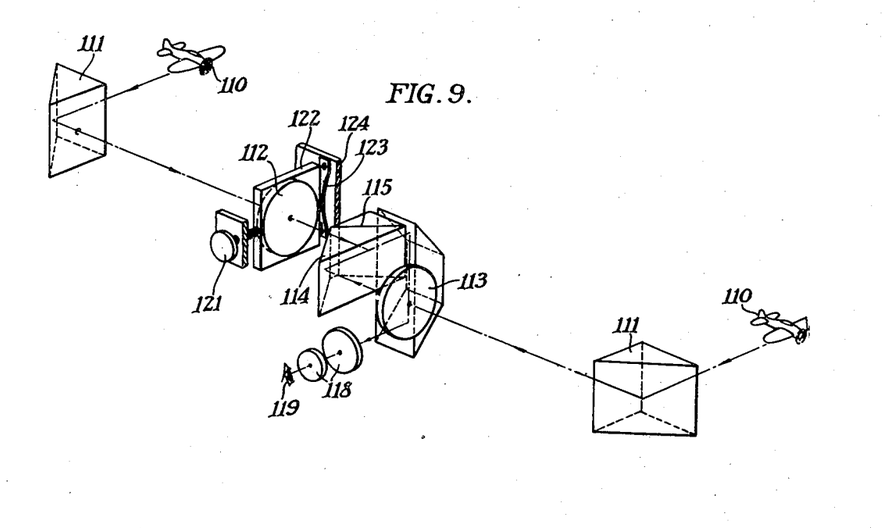
Fig. 9 is a perspective view of an optical system particularly useful in a form of the invention in which the instrument is mounted on a helmet or otherwise carried on the head of the observer.

In Fig. 9 light from a target represented by small airplanes 110 is received at spaced viewing points and directed by prisms 111 through objectives 112 and 113 to a prism assembly 114 including a semi-transparent mirror 115 at which the beams are combined and directed together through eyepiece 118 to the eye 119 of an observer. Coincidence adjustment is provided by moving the objective 112 traversely relative to the object beam passing therethrough. This adjustment is made by turning a screw 121 against which the mount 122 of the objective 112 is held by a spring 123 carried by the housing 124 (shown completely broken away except for the portions carrying the screw 121 and the spring 123).

Figure 10:
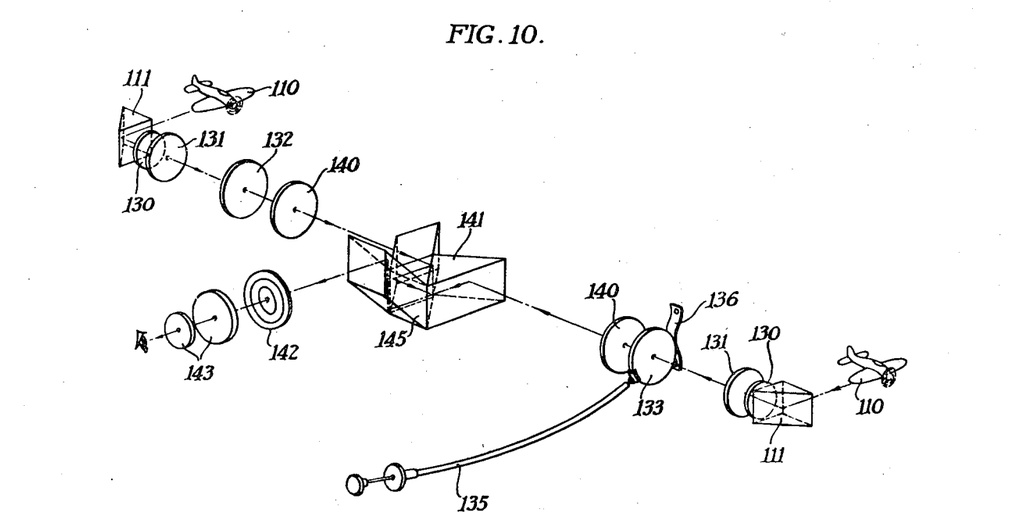
Fig. 10 is a similar view of an optical system suitable for use in a form of the invention applied to airplanes.

A somewhat more elaborate arrangement is shown in Fig. 10 in which the object beams are relayed before reaching the comparison planes. These object beams are brought to focus by objectives 130 forming primary images in field lenses 131 and light from these primary images is collimated by objectives 132 and 133, the latter one of which is transversely adjustable to act as the light deviator for adjustment of coincidence. This transverse adjustment of the objective 133 is provided through a cable control 135 which moves the lens 133 against resilient pressure provided by spring 136.

These collimated beams are focused by objectives 140 and a prism assembly 141 in the image plane 142 of an eyepiece 143. The prism assembly 141 includes rhomb 145 so that the eyepiece is above the optical system as a whole and the observer can, with his other eye, look over the instrument.

Figures 11, 11A, 12, 13:
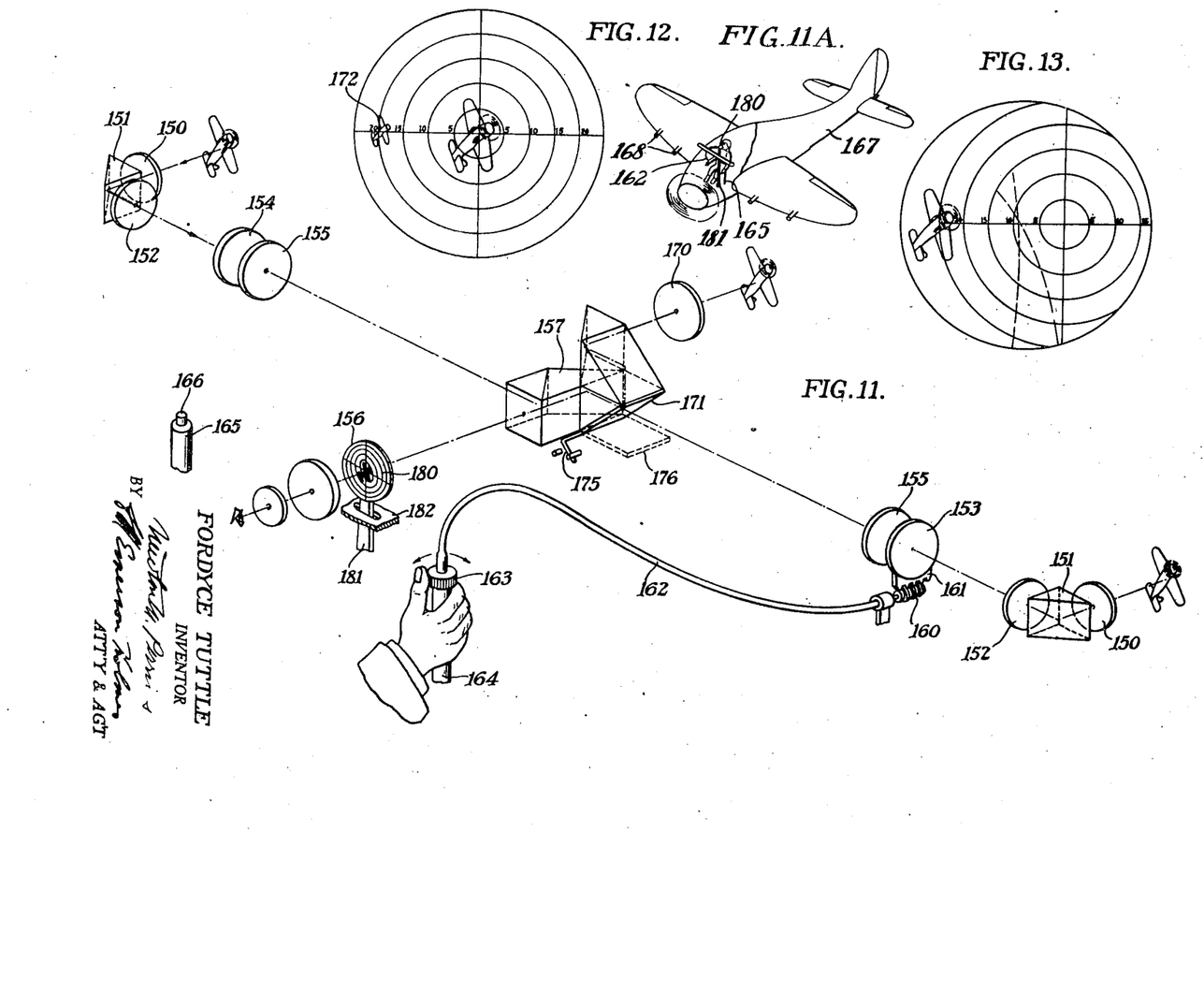
Fig. 11 shows a preferred form of optical system similar to that shown in Fig. 10.
Fig. 11A is a perspective view partially cut away showing a fighter plane incorporating the optical system shown in Fig. 11.
Figs. 12 and 13 show the fields of view through the eyepiece of the instrument shown in Fig. 11, under different conditions.

In Figs. 11 and 11A the object beams are focused by objectives 150 located optically ahead of the viewing point prisms 151 to form primary images in field lenses 152. As before these primary images are relayed by collimators 153 and 154 and re-focused by objectives 155 to form images in a comparison plane 156 after passing through a prism assembly 157. This embodiment of the invention is particularly intended for use in fighter planes and the coincidence of the target images is obtained by a worm 160 driving a rack 161 carrying the collimator 153. The worm is turned through a rotating cable 162 by a knob 163 conveniently located on top of one of the controls 164 of the airplane 167. The top of another control 165 of the airplane 167 is provided with a button 166, pressure on which starts the machine guns 168 mounted in the wing of the plane firing.

This arrangement has two additional features having to do with the field of view. First, in order to provide a wider field of view for first sighting on the target, a relatively short focal length objective 170 also sends light through the prism assembly 157, when a mirror 171 is in the position shown. This provides a small image 172, as shown in Fig. 12 which can be quickly brought to the center of the field. The mirror 171 is then moved by handle 175 to the position shown by broken lines 176, at which time the view finder image 172 is no longer visible and the field includes only two target images. These are then brought into coincidence by adjustment of the collimator 153 as shown in Fig. 13.

The second special feature is a reticle 180 rigidly carried in the comparison plane 156 by a support 181 extending through the housing 182 of the optical system. The optical system as a whole is movable slightly relative to this reticle, the hole in the housing being just large enough to permit such slight movement. Before starting the fire from the gun, usually before the target is within range, the pilot observer aims his plane and gun approximately by means of the reticle 180 which is indicative of the actual direction of the gun. When he thinks he has provided the proper lead on the target he starts firing and then observes the tracer fire, specifically the crossover point and corrects his aim by changing the direction of his plane, to bring the crossover point on target. He then looks for another target. If during the preliminary adjustment of his direction to allow for lead, he finds that the separation of the center of the reticle and the target is greater than ½ of the field of view provided by the instrument, he moves the optical system slightly to one side or the other, by pushing with his head against an extension on the housing of the instrument (not shown). His ultimate field of view in this case may be similar to that shown in Fig. 13 in which the reticle indicative of the actual direction of the gun appears at one side of the field and the target at the other side. In Fig. 13 it will be noted that the crossover of the tracer fire appears to be slightly in advance of the target which would indicate that too great an allowance has been made for lead and that the aim should be adjusted accordingly.

Figures 14, 15, 16:
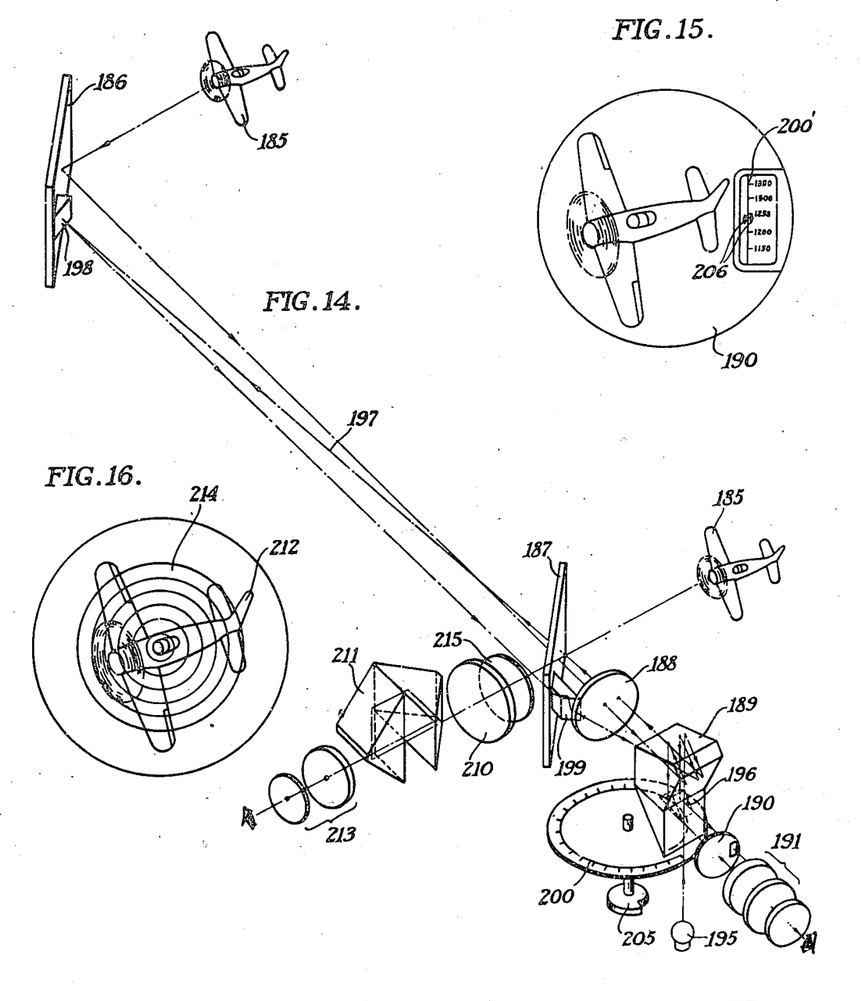
Fig. 14 is a perspective view of an optical system alternative to that shown in Figs. 5 and 6.
Figs. 15 and 16 show the fields of view through the two eyepieces of the instrument shown in Fig. 14.

In Fig. 14 the present invention is incorporated into a collimating range finder. Light from a target represented by small planes 185 is directed by a mirror 186 and a semi-transparent mirror 187 through an objective 188 and an erecting prism 189 to form superimposed images in an image plane 190 viewable through an eyepiece 191. To provide collimation in accordance with the teachings in copending applications Serial Nos. 472,831, Mihalyi; 472,832, Mihalyi; 472,835, Mihalyi and Tuttle; all filed January 19, 1942; and 479,096, Mihalyi; 479,097, Mihalyi, both filed March 13, 1943, all of which issued June 4, 1946, as Patents 2,401,700; 2,401,701; 2,401,709; 2,401,-704, and 2,401,705 respectively, light from a lamp 195 is introduced by a small prism 196 into the prism assembly 189 sending a beam of light represented by a ray 197 which is reflected by a spot mirror 198 carried on the mirror 186. The returning beam is again reflected by a dove prism 199 carried on the semi-transparent mirror 187. Since the outgoing beam 197 was collimated by the objective 188 the returning beam is brought to focus by this same objective to form an image of a small part of a spiral line 200 at one side of the image plane 190, the image being shown as 200' in Fig. 15. That is, light from the lamp 195 illuminates the line 200 and a scale adjacent thereto so that the image of both the line and the scale appear in the field of view 190, as shown in Fig. 15. Coincidence is obtained by tilting the mirror 186 by a long lever carrying a cam follower which engages a cam 205, all as shown in detail in Serial No. 479,096 mentioned above. Rotation of the cam moves one of the target images relative to the other and at the same time rotates the spiral line 200 so that the image 200' always stays between two diamond shaped marks 206 engraved on the image plane 190. When the target images are brought into coincidence as in Fig. 15, the scale indicates the range, the diamond marks 206 acting as the index for the scale. In Fig. 15 the range is indicated as 1240 yards. If the instrument for any reason gets out of adjustment, this maladjustment is indicated by the image 200' falling to one side of the fiducial spots 206. The maladjustment is then corrected by tilting the semi-transparent mirror 187 by means not shown here, but described in detail in patent applications Serial Nos. 461,584 and 461,585, filed October 10, 1942, by Mihalyi which issued July 9, 1946, as Patents 2,403,737 and 2,403,738 respectively.

According to the present invention the target beams coming from the other side of the semi-transparent mirror 187 which beams are usually discarded, are utilized for tracer spotting. These beams are focused by an objective 210 and an erecting prism 211 forming target images 212 as shown in Fig. 16 in the focal plane of an eyepiece 213 which is also provided with a reticle 214. It is sometimes desirable for tracer spotting to have less intensity in the target images or temporarily to eliminate one of the images entirely. A suitable filter may be used at 215 to reduce the image intensity, or if the mirror 187 is dichroic a suitable selection in the color of the filter 215 will reduce the intensity of one of the images relative to the other in the field of view of the tracer observer.

Figure 17:
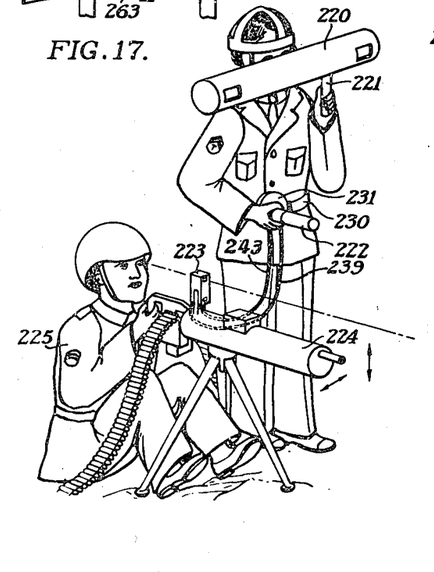
Fig. 17 is a perspective view of a machine gun and a tracer spotter in which the gun sight is adjusted by cables operated by a joy stick.
Figure 18:
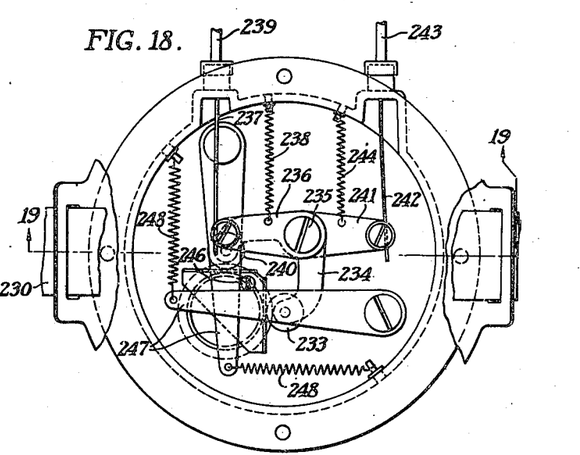
Figs. 18 and 19 are respectively a rear view and a top view partly in section of the joy stick control of Fig. 17.
Figure 19:
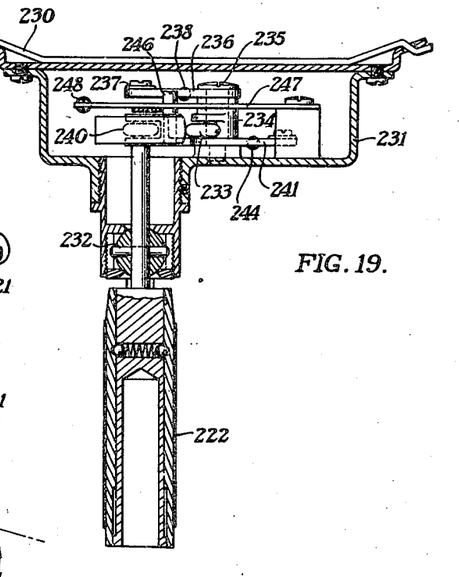

In Fig. 17 the tracer observer has an instrument 220 which is supported from his head and in which coincidence adjustment is provided by rotation of a handle 221. On his belt, is mounted a joy stick 222 which he moves to make corrections in either azimuth or elevation in order to bring the tracer crossover as he sees it, on target. The control by the joy stick 222 is provided through two push-pull cables to an infinity sight 223 carried on a machine gun 224, the aiming of the gun being provided by a gunner 225. In Fig. 17, the cables are partly hidden by the gun 224 but actually they hang in a loop and extend to the base of the sight 223, the details thereof being shown in Fig. 20. The connection is indicated by broken lines in Fig. 17. The details of the joy stick 222 are shown in Figs. 18 and 19. The joy stick 222 is carried by a belt 230 and is provided with a base 231 and a universal joint 232. The component of the joy stick movement in one direction pushes a roller 233 mounted on a bell crank 234 pivoted about 235, the other end 236 being in a different plane and operating the core 237 of a push-pull cable whose housing is shown at 239. The other component of the joy stick movement moves a roller 240 which through a lever 241 also pivoted about 235 operates the core 242 of a push-pull cable 243. The roller 233 is held in engagement with the joy stick by a spring 238 engaging the upper arm 236 of the bell crank and similarly the roller 240 is held in position by a spring 244 engaging the lever 241. The pressure exerted on the joy stick due to these two springs 238 and 244 would cause it to assume a normal position off center and the operator would always be working against the pressure of the two springs. To insure smooth action and to overcome the effect of these springs 238 and 244 on the joy stick itself, counter-balancing forces are provided in the form of spring urged arms 247 which engage a lug 246 extending from the base of the joy stick 222. Springs 248 holding these levers 247 in contact with the lug 246 are arranged to have just sufficient pressure to balance that given to the rollers 233 and 240 by the springs 238 and 244.

Figure 20:
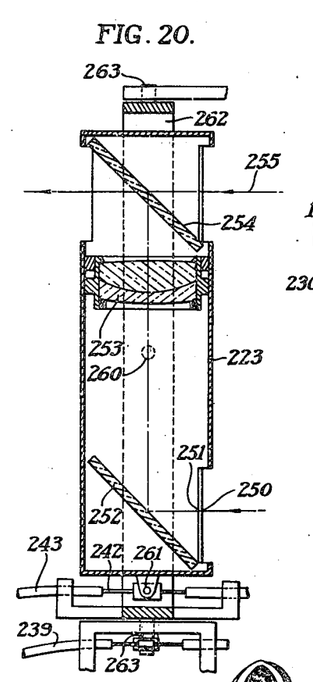
Fig. 20 is an elevation in section of an infinity sight employed as a gun sight in Fig. 17.

The cables 239 and 243 are connected to and adjust the elevation and azimuth angle of the infinity sight 223 which is shown in detail in Fig. 20. Daylight through a window 250 illuminates a reticle 251 engraved on the back of the window and light from this reticle is directed by a mirror 252 through a collimating lens 253 and thence to a semi-transparent mirror 254 which combines the reticle beam and the target beam 255 passing directly therethrough. In common with all "infinity sights" this causes the reticle to appear at infinity and hence free of parallax relative to the target on which it is superimposed. Tilting of the sight as a whole about pivots 260 changes the elevation of the sight. This tilting is provided by the cable 243 which engages the housing of the sight 223 at the point 261. The cable 243 is shown continuing on past this engagement since any number of sights may be coupled in series to be operated simultaneously. The pivots 260 are in gimbals 262 which are pivoted about a vertical axis 263 and rotation of the gimbals 262 carrying the sight 223 with it to give azimuth adjustment, is provided by the cable 239.

Figures 21, 22, 23:
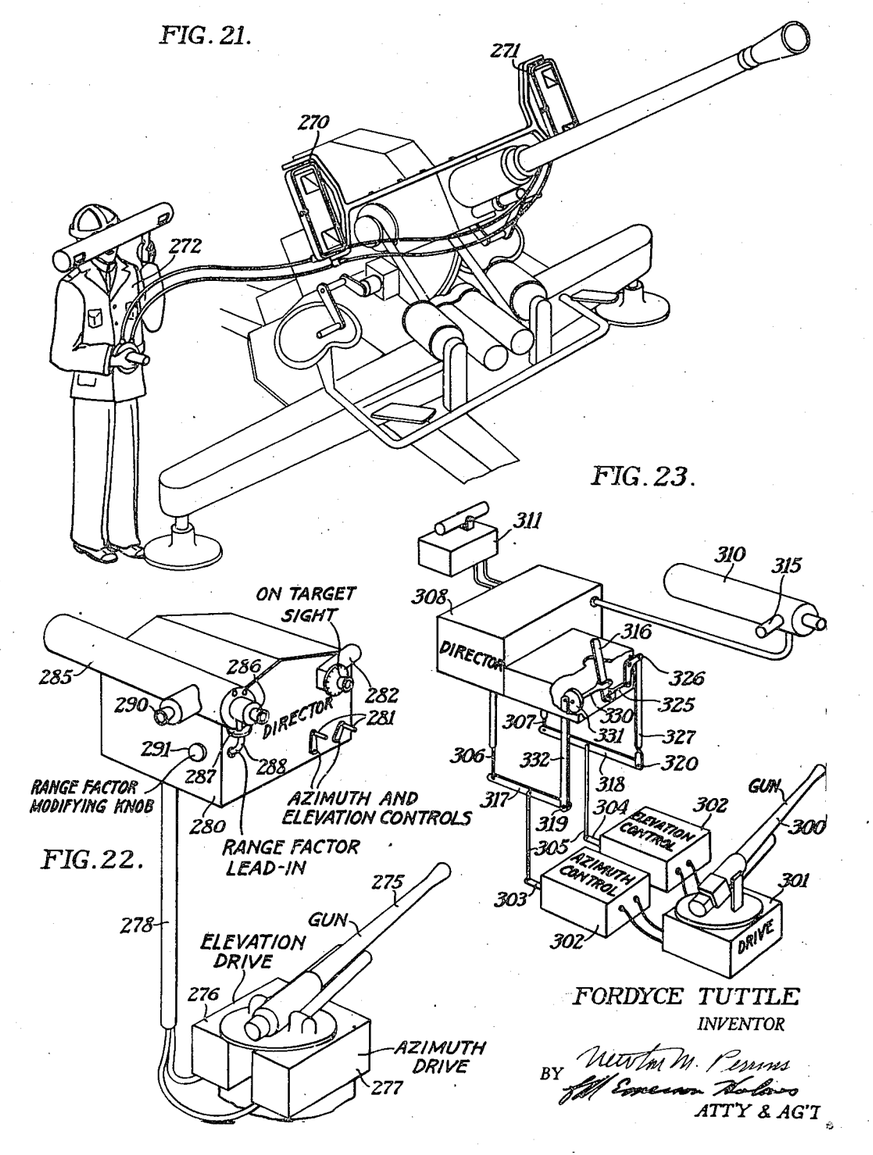
Fig. 21 is a perspective view of a high caliber machine gun having independent control of azimuth and elevation with the present invention applied to both controls.
Fig. 22 is a perspective view schematically showing an embodiment of the invention in which the gun is primarily aimed by a director and the aim is corrected further by the present invention.
Fig. 23 similarly shows an instrument alternative to Fig. 22 for modifying the effect of the director.

In Fig. 21 two such infinity sights 270 and 271 are mounted in series for simultaneous operation by the tracer observer 272. These sights are used in the independent control of azimuth and elevation. Although the gun operators, not shown, operate the azimuth and elevation of the gun independently, the sight for each of them is adjusted in both coordinates.

In Fig. 22 the operation of the invention applied to a director controlled gun is shown schematically. The gun 275 is mounted to be driven in elevation and azimuth by suitable electric drives 276 and 277. The control for these drives is provided through a cable 278 from a director 280. The operation of the director is such that it takes into account the movement of the target relative to the gun, the effect of gravity, the range of the target, the muzzle velocity of the shell being fired from the gun, the effect of the wind, etc. As far as the present invention is concerned most of these factors may be provided in any of the known manners. For example, an operator may look through a sighting device 282 mounted on the director and then move the director and the sighting device by means of cranks 281 to keep the target accurately centered in his sight. The cranks 281 may provide the actual drive for the director or may be merely controls, the driving mechanism itself being electrical and the controls being arranged to provide any acceleration or change of direction required to keep the target centered in the field of view. The following of the target indicates of course the elevation and azimuth of the target and, by the rate of change, indicates the lead required, all of which is computed by the director and fed into the driving mechanism of the gun. In the arrangement shown the range factor is set through the director (also to effect the lead computation) from a range finder 285 provided with a primary eyepiece 286 through which the range observer looks and by means of a knob 287 brings two target images into coincidence. The setting of the ranging knob 287 is in turn set into the director by a range actor lead-in 288. The range finder may conveniently be of the type shown in Fig. 14.

According to the invention the range finder 285 is provided with a second eyepiece 290 through which the tracer observer spots the tracer fire and its apparent crossover point. If the director and those operating it through the sight 282 and the ranging sight 286 are all working perfectly and the gun driving mechanism is responding perfectly and other factors such as shell velocity are not varying from that for which the director is set, the observer looking in at the eyepiece 290 will see the crossover point on target. However, in practice there is usually some slight variation in one or more of the factors involved and this variation usually results in the wrong lead being given to the aim. Since the range affects the lead directly, it has been found in practice that the present invention is quite adequate when employed merely for correcting the range response of the whole system. Therefore the tracer observer at eyepiece 290 is provided with a knob 291 which, in the director modifies the range factor as it is set into the computing mechanism. The manner in which this modification takes place may have any form. For example, in directors which employ electrical means of transmitting intelligence the range signal may be modified by a suitable resistor controlled by the knob 290. In directors employing mechanical means for transferring the range factor from the range finder to the computing mechanism, a leverage system with an adjustable fulcrum controlled by the knob 291 may be employed. Such an arrangement will be obvious from Fig. 23 which is somewhat more elaborate since it provides independent control of the azimuth and the elevation by the tracer spotter rather than a control of the range factor only.

In Fig. 23 which is extremely schematic in order to show the principles involved, a gun 300 is driven in azimuth and elevation by suitable driving mechanism 301 in which the elevation and azimuth is controlled by suitable mechanisms 302 which in turn are controlled by levers 303 and 304. The setting of these latter levers through connecting arms 305 is provided from push-pull cables 306 and 307 operated by a director 308.

The range factor is set into the director from a range finder 310 and other factors such as elevation, azimuth, target velocity, etc., are set into the director from a lead computing mechanism 311. It is often desirable since the altitude or height of the target often remains constant when firing anti-aircraft guns, to have the range finder 310 in the form of a height finder so that the operator only has to make very slight adjustments to keep the instrument set, the elevation angle of the target is of course fed into the range finder mechanism so that it reads height and then this height is converted back to slant range by a suitable computing mechanism in the director which is also responsive to the elevation angle set in from the computor 311. According to the invention the tracer spotter using the second eyepiece 315 of the range finder 310 modifies the elevation and azimuth output signals indicated by the setting of the push-pull mechanisms 306 and 307 by means of a joy stick 316. That is, the elevation and azimuth settings of the devices 306 and 307 are not fed directly to the arms 305 but operate levers 317 and 318 pivoted at points 319 and 320 respectively. These pivot points may be adjusted up and down by the joy stick 316 through any suitable mechanism. In the arrangement shown, any component of the motion of the joy stick toward or away from the target pulls a connecting rod 325 which through a bell crank 326 raises and lowers a rod 327 which carries the pivot 320. Similarly any component of the motion of the joy stick 316 at right angles to the direction of the target rotates a rod 330 and a wheel 331 and attached to the circumference of this wheel 331 is a member 332 which carries the pivot 319.

These latter embodiments of the invention in which the tracer observer makes only secondary corrections in the setting of the aim of the gun have been found to be preferable and to give extreme accuracy of fire.

Having thus described various forms of apparatus according to the invention and various methods of fire control involved in the invention, I wish to point out that the scope of the invention is defined by the following claims.

What I claim and desire to secure by Letters Patent of the United States is:

1. The method of fire control which comprises sending tracer fire along with the damage inflicting fire from a rapid fire gun, optically forming in a single field of view and from spaced viewing points superimposed images of the target being fired on and images of the tracer fire, observing said images whereby the tracer fire appears as travelling along two lines crossing over at a distant point, adjusting the forming of the target images to bring them into coincidence and aiming the gun to bring the apparent crossover point of the tracer fire onto the target.

2. The method according to claim 1 in which said observing is done respectively through complementary color filters whereby the lines of tracer fire appear colored and the crossover point appears approximately white.

3. The method according to claim 1 in which an observer looking at said images cooperates with another observer in said aiming by adjusting the gunsight through which the other observer aims the gun.

4. The method according to claim 1 in which said adjusting of the forming of the images is coupled to the range setting of the gun whereby the latter is simultaneously adjusted.

5. The method of fire control when firing on a moving target which comprises sighting the target through a reticle indicative of the actual gun direction, aiming the gun approximately to allow lead on the target, optically forming in a single field of view and from spaced viewing points superimposed images of the target, adjusting the forming of the images to bring them into coincidence, sending tracer fire along with damage inflicting fire from the gun optically forming images of the tracer fire in said field of view, observing said superimposed images and said tracer fire images whereby the tracer fire appears as travelling along two lines crossing over at a distant point and correcting the aim of the gun to bring the apparent crossover point of the tracer fire onto the target.

6. The method according to claim 4 in which the coincidence adjustment and the approximate aiming of the gun is done substantially simultaneously just prior to the starting of the tracer fire.

7. The method of fire control which comprises aiming a gun by a director responsive to ballistic factors including range and transverse target movement set into the director, optically forming in a single field of view and from spaced viewing points superimposed images of the target and images of the tracer fire, adjusting the forming of the images to bring them into coincidence, sending tracer fire along with damage inflicting fire from the gun, observing said images whereby the tracer fire appears as travelling along two lines crossing over at a distant point and adjusting the director to bring the apparent crossover point of the tracer fire onto the target.

8. The method according to claim 7 in which the adjusting of the director consists of modifying the setting in of the target range factor to affect directly the computation of lead.

9. A fire control instrument for a rapid fire gun comprising an adjustable gun sight through which a primary observer aims the gun, an optical system for a person to view in a single field of view superimposed images of the target being fired on, said images being from spaced viewing points, means for adjusting the optical system to bring the target images into coincidence, a gun firing tracer, optical images of the tracer fire being formed in said field of view whereby the tracer fire from the gun will appear along two lines crossing over in the plane of the target when the images are in coincidence and means for adjusting the gun sight in accordance with the discrepancy between the crossover point of the tracer fire and the target, the latter adjusting means being operable by the person observing the superimposed target images and consisting of means for adjusting the sight separately in elevation and azimuth, and a joy stick lever connected by cables to the separate azimuth and elevation adjusting means in accordance with the components of the joy stick setting, said joy stick being positioned to be operable by the person observing the target images.

FORDYCE TUTTLE.

REFERENCES CITED

The following references are of record in the file of this patent:

UNITED STATES PATENTS

| Number | Name | Date |
| --- | --- | --- |
| 583,703 | De Grousilliers | June 1, 1897 |
| 789,783 | Anderson | May 16, 1905 |
| 1,327,204 | Henderson | Jan. 6, 1920 |
| 1,413,207 | Voller et al. | Apr. 18, 1922 |
| 1,445,028 | Morse | Feb. 13, 1923 |
| 1,509,267 | Sperry | Sept. 23, 1924 |
| 1,692,364 | Akemann | Nov. 20, 1928 |
| 1,724,093 | Kauch et al. | Aug. 13, 1929 |
| 1,811,614 | Cover | June 23, 1931 |
| 1,862,918 | Barnes | June 14, 1932 |
| 1,968,002 | Nowicki et al. | July 24, 1934 |
| 1,974,864 | Fletcher | Sept. 25, 1934 |
| 2,015,869 | Pulz | Oct. 1, 1935 |
| 2,157,575 | Schmidt | May 9, 1939 |
| 2,178,857 | Hineline | Nov. 7, 1939 |
| 2,186,007 | Chamberlain, Jr. | Jan. 9, 1940 |
| 2,286,474 | Durham et al. | June 16, 1942 |
| 2,339,461 | Crooke | Jan. 18, 1944 |
| 2,339,521 | Ross | Jan. 18, 1944 |
| 2,352,777 | Douden | July 4, 1944 |
| 2,354,153 | Stebbins | July 18, 1944 |
| 2,362,887 | Corte | Nov. 14, 1944 |

FOREIGN PATENTS

| Number | Country | Date |
| --- | --- | --- |
| 301,981 | Italy | Oct. 14, 1932 |
| 780,117 | France | Jan. 24, 1935 |
| 787,803 | France | July 16, 1935 |
| 832,814 | France | July 11, 1938 |
| 428,759 | Great Britain | May 17, 1935 |
| 431 991 | Great Britain | July 18, 1935 |